United States Patent [19]
Guidetti et al.

[11] Patent Number: 5,782,332
[45] Date of Patent: Jul. 21, 1998

[54] DEVICE AND CORRESPONDING METHOD FOR GROUPING TOGETHER RANDOM PRODUCT FLOWS INTO A SINGLE PATH ACCORDING TO A PRE-ESTABLISHED AND ADJUSTABLE RATE OF ADVANCE

[75] Inventors: Dario Guidetti, Grignasco; Michele Decuzzi, Prato, both of Italy

[73] Assignee: Sasib Packaging Italia S.R.L., Pistoia, Italy

[21] Appl. No.: 512,385

[22] Filed: Aug. 8, 1995

[51] Int. Cl.[6] ............................................. B65G 47/46
[52] U.S. Cl. .......................... 198/357; 198/444; 198/448
[58] Field of Search ................................ 198/357, 444, 198/448, 451, 452, 454, 460.1

[56] References Cited

U.S. PATENT DOCUMENTS

| | | | |
|---|---|---|---|
| 3,063,544 | 11/1962 | Yen | 198/357 |
| 3,223,225 | 12/1965 | Clark et al. | 198/357 |
| 3,523,618 | 8/1970 | Nielsen | 198/357 X |
| 3,774,748 | 11/1973 | Dederer et al. | 198/444 |
| 3,835,979 | 9/1974 | Calvert et al. | 198/451 X |
| 4,044,897 | 8/1977 | Maxted | 198/448 X |
| 5,038,911 | 8/1991 | Doane et al. | 198/357 |
| 5,070,995 | 12/1991 | Schaffer et al. | 198/460.1 |
| 5,092,451 | 3/1992 | Jones et al. | 198/444 X |
| 5,267,638 | 12/1993 | Doane | 198/444 X |
| 5,341,916 | 8/1994 | Doane et al. | 198/460.1 |

FOREIGN PATENT DOCUMENTS 0527542  2/1993  European Pat. Off. .

*Primary Examiner*—D. Glenn Dayoan
*Attorney, Agent, or Firm*—McGlew and Tuttle

[57] ABSTRACT

A device for aligning a plurality of products, arriving via at least two non-correlated inlet paths, according to a predeterminable pitch along one outlet path. The device includes a plurality of adjacent conveyor belts, here being as many conveyor belts as there are inlet paths. A corresponding sensor is associated for each of the conveyor belts to determine the arrival of a product on the corresponding conveyor belt. A separate actuator with a corresponding position transducer moves each conveyor belt. A control unit is connected to the actuators, the sensors (F1, F2) and the position transducers. The control unit controls the movement of the conveyor belts such that the products on the outlet path are arranged according to the predeterminable pre-set pitch.

17 Claims, 3 Drawing Sheets

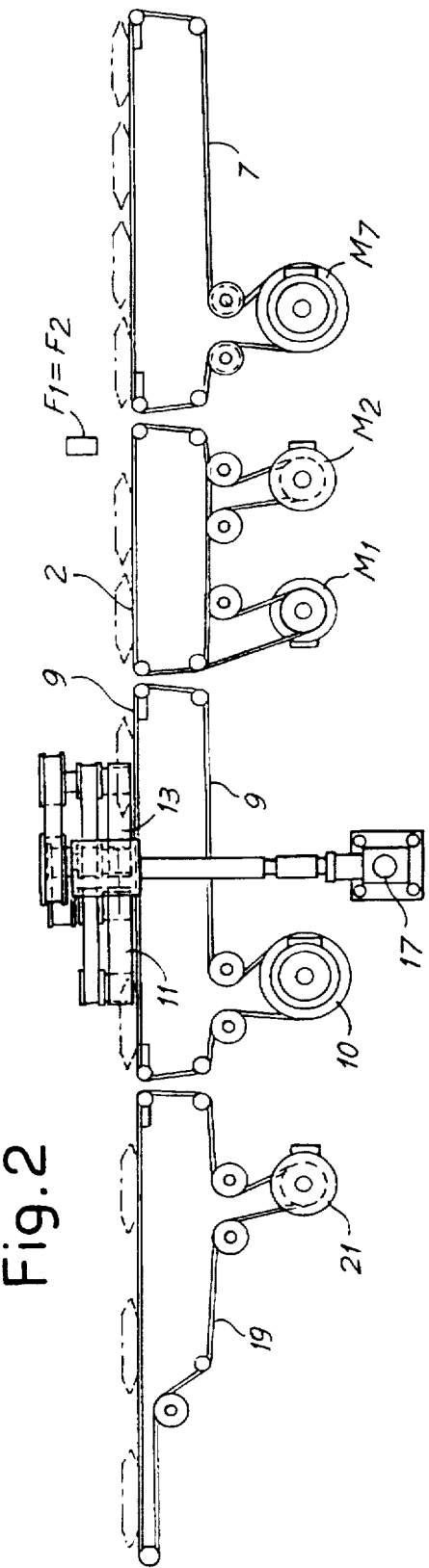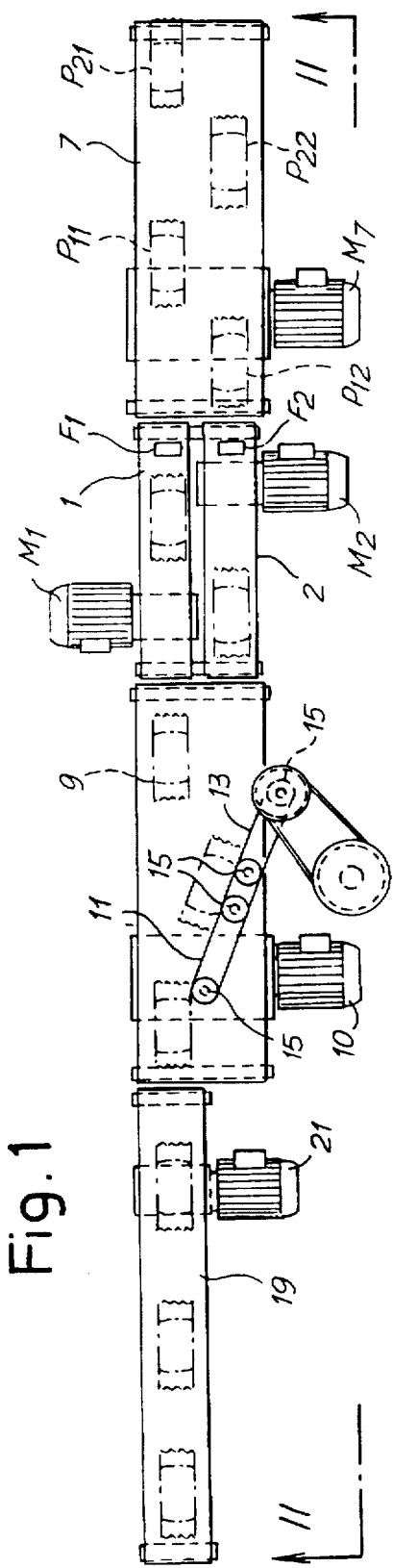

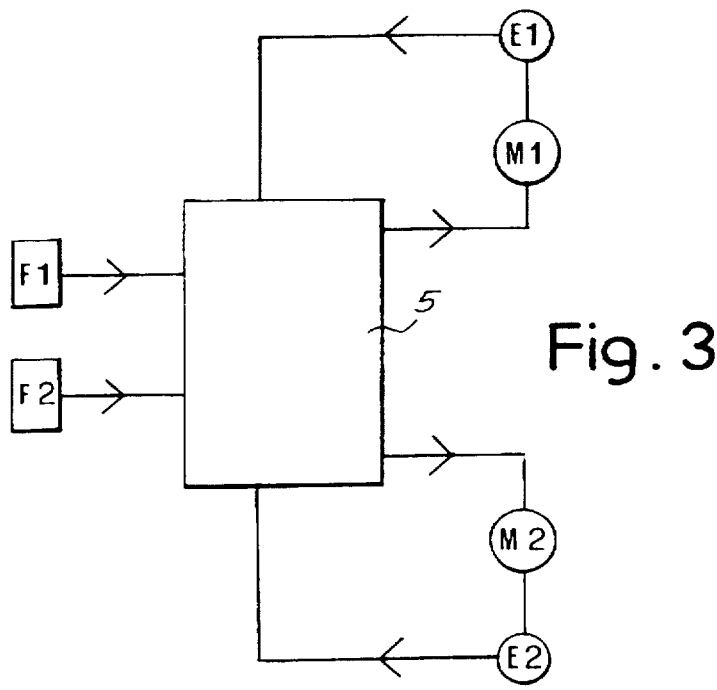
Fig. 3
Fig. 4A
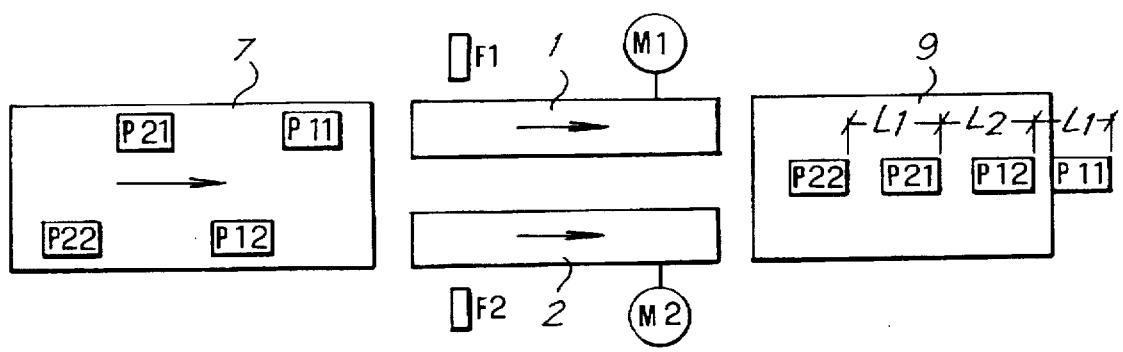
Fig. 4B
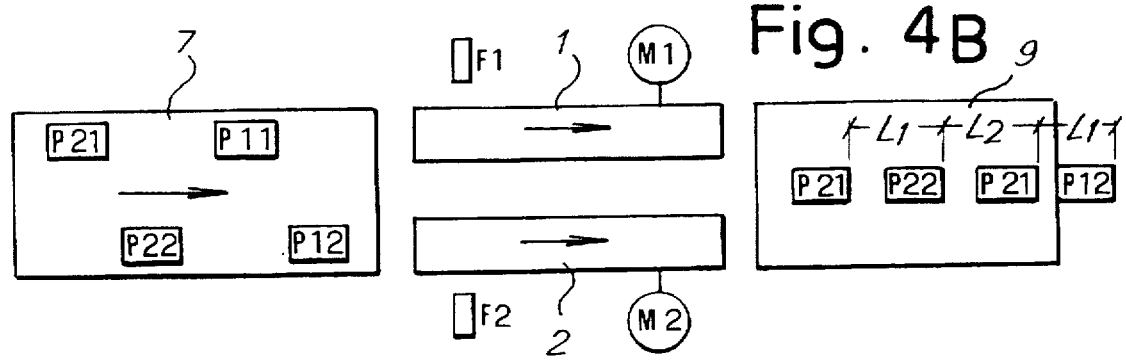

DEVICE AND CORRESPONDING METHOD FOR GROUPING TOGETHER RANDOM PRODUCT FLOWS INTO A SINGLE PATH ACCORDING TO A PRE-ESTABLISHED AND ADJUSTABLE RATE OF ADVANCE

FIELD OF THE INVENTION

The present invention relates to a device and to a method for aligning a plurality of products, arriving in a random manner from at least two sources positioned upstream from the device, according to a specific pitch on a conveying member.

BACKGROUND OF THE INVENTION

In the description which follows, particular reference will be made to the problems arising in machines for packaging foodstuffs, for which the device offers an advantageous solution, nevertheless (as will be clear to those skilled in the art) the same device may also be applied to different packaging machines or in other sectors experiencing similar problems in relation to ordering units arriving in a random manner via two or more inlet paths along a single outlet line or path.

The food industry frequently experiences the problem of conveying products to be packaged to a packaging machine, in particular, but not exclusively, foodstuffs which have already been packaged in individual packages and which then need to be grouped together into containers containing a plurality of products. These containers represent the multipack units which go on sale to the public. The individual products arrive from a first upstream packaging machine, typically a horizontal "cushion-type" packaging machine, whose production speed rarely reaches or exceeds 300 packages per minute and, in the case of specific types of product, which require added protection, the packaging speed falls short of 150 units per minute.

On the other hand, the packaging machines which collect the individual pre-packaged products and insert them into the containers designed for multipack packaging, can reach speeds of up to 500 packages per minute. In many cases, therefore, there is the need to group together the flow of products arriving from two or more upstream packaging machines in order to convey them into a single machine that fills the multipack containers, so that the downstream machine can be exploited to its full capacity.

Each of the upstream packaging machines dispense the individual products onto a separate path, i.e. onto a separate conveyor, at a rate which is specific to the machine. The downstream machine, in turn, needs to be fed with a series of products which are mutually aligned on an inlet belt and are arranged with a pre-established minimum distance between them.

Currently systems exist which collect together several flows of products from several upstream machines in order to convey them to a single downstream machine and, in these systems, the products are temporarily stopped by mobile barriers when this is necessary in order for said products to be correctly fed into the downstream machine. These systems are not satisfactory, not least because they interfere mechanically with the product and can slow the process down.

SUMMARY AND OBJECTS OF THE INVENTION

The primary object of the present invention is to produce an improved device that collects together the flows of products from two or more inlet paths and distributes the exiting products along a single path, in longitudinal alignment and with a predetermined minimum distance between the individual products, so that they can be correctly fed into the downstream machine.

During its operation, the device must take into account the fact that the flows arriving onto the inlet paths are completely independent of one another and that the sum of the products arriving simultaneously from the upstream paths must never exceed the maximum absorption capacity of the downstream machine.

This and other objects and advantages, which will be clear to those skilled in the art on reading the following description, are achieved with a device for aligning a plurality of products, arriving via at least two non-correlated inlet paths, according to a predeterminable pitch along one outlet path, which device comprises: a plurality of adjacent conveyor belts, there being as many conveyor belts as there are inlet paths; a corresponding sensor for each of said conveyor belts that determines the arrival of a product on the corresponding conveyor belt; an actuator with a corresponding position transducer for each conveyor belt; and a control unit to which said actuators, said sensors and said position transducers are connected, which unit controls the movement of said conveyor belts such that the exiting products are arranged according to the pre-set pitch.

In one possible embodiment of the invention, the control unit carries out the following operations:

- determines, via the signal generated by said sensors, when a first product arrives onto one of the conveyor belts;
- controls the corresponding actuator such that said first product is made to advance by a predetermined length on the corresponding conveyor belt;
- blocks any further products arriving onto the other conveyor belts until said first product has advanced by said predetermined length;
- and authorizes the next product to advance once the first product has been made to advance by said predetermined length.

Using this arrangement, the products downstream from the conveyor belts are mutually aligned according to a pitch which can be predetermined as desired by suitably programming the control unit, irrespective of the rate at which the products arrive from the machines upstream from the inlet paths, as long as there is a sufficient distance (which is easily determined) between the individual incoming products to avoid an accumulation of products at the inlet of the conveyor belts. This distance can be ensured by inserting an intermediate conveyor belt if necessary.

In practice, provision may be made for the control unit to cause the actuator associated with the conveyor belt, on which the first product is located, to advance in successive steps and, at each step, to check if a further product has arrived on the other inlet paths, blocking the advance of the corresponding conveyor belt should this condition arise.

The device has a plurality of adjacent conveyor belts. It may be advantageous to arrange all the products according to a common alignment before they are fed, for example, to a downstream packaging machine. For this purpose, according to a possible embodiment of the device, arranged downstream from said conveyor belts there may be longitudinal alignment means that longitudinally align the products coming off said adjacent conveyor belts. The alignment means may take on various forms. They may, for example, comprise a deviating member, optionally in the form of a flexible motorized member.

3

Further advantageous embodiments of the device and of the method according to the invention are indicated in the appended claims.

The invention will be more clearly understood on reading the following description with reference to the appended drawings which show a possible embodiment of the invention. In the drawings:

BRIEF DESCRIPTION OF THE DRAWINGS

FIG. 1 is a plan view of an embodiment of the device according to the invention;

FIG. 2 is a side view along II—II of FIG. 1;

FIG. 3 is a block diagram of the control electronics;

FIGS. 4A and 4B show two operating conditions, illustrated in a very diagrammatic manner, in order to illustrate the ways in which the device operates.

DESCRIPTION OF THE PREFERRED EMBODIMENT

Figure 5:
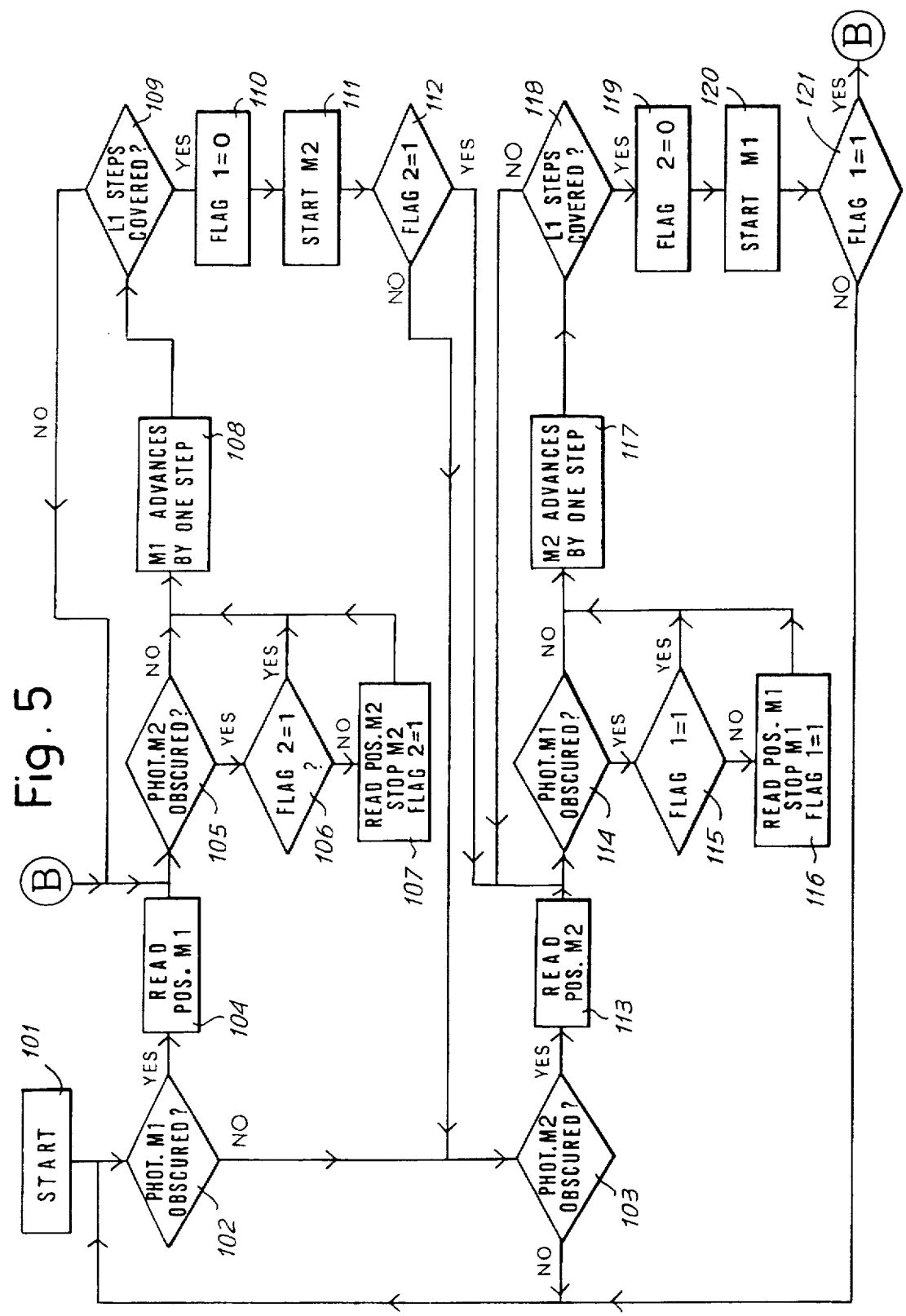
FIG. 5 is a flowchart for the logic of the control system of the device.

The mechanical part of the device will initially be described with reference to FIGS. 1 and 2. In the following description reference is made to a device which regulates the rate of feed of products arriving via two paths, however the concept can easily be extended to include more complex devices, with more than two inlet paths.

The device comprises a pair of adjacent and parallel conveyor belts 1 and 2, each of which is controlled by a respective brushless motor M1 and M2. Associated with each conveyor belt 1 and 2 is a photoelectric cell F1 and F2 respectively, which, in the representation shown in FIGS. 1 and 2, are indicated above the corresponding belts 1 and 2. The motors M1 and M2 are fitted with a corresponding encoder or position transducer E1, E2. The photoelectric cells F1 and F2, the motors M1 and M2 and the encoders E1 and E2 are connected to a control card 5 (FIG. 3) with a microprocessor which, in accordance with the methods which will be described below, controls the speed of the motors M1 and M2 as a function of the signals arriving from the photoelectric cells F1 and F2 and of the signals relating to position supplied by the encoders E1 and E2.

In order to provide correct interfacing with the upstream machines, the two belts 1 and 2 are preceded by an inlet conveyor 7 (or by a pair of parallel conveyors) controlled by a motor M7. The speed of the conveyor 7 is such as to ensure that a certain distance is maintained between the individual products arriving from the upstream machines. In FIG. 1 P11 and P21 indicate two successive products coming from a first machine onto a first inlet path and P12 and P22 indicate two successive products coming from a second upstream machine onto a second inlet path.

Located downstream from the two parallel belts 1 and 2 is a collection conveyor 9 which is controlled by a motor 10 and is fitted with a motorized plowshare, i.e. with a system of conveyor belts 11, 13 travelling around rollers with a vertical axis 15 and actuated by a motor 17. The motorized plowshare 11, 13 pushes the products towards one side of the collection conveyor 9 so that they come off said collection conveyor onto an outlet conveyor 19 in longitudinal alignment. The outlet conveyor 19 terminates at the entrance to the downstream packaging machine.

The photoelectric cells F1 and F2 detect the arrival of the products P11, P12, P21, P22 which arrive in a random manner and, on the basis of a logic which will be described

4 below, distributes them on the belts 1 and 2 such that they are spaced apart at a constant pitch in order that they can be fed into the single downstream packaging machine. FIGS. 4A and 4B show two typical situations which may arise during operation: in FIG. 4A there are four products on the inlet conveyor 7, two of which (P11 and P21) arrive from a first upstream machine, while the others (P12 and P22) arrive from the other machine. The product P11 is further advanced than the product P12 and therefore the first photoelectric cell to be obscured is the photoelectric cell F1. The microprocessor controls the speed of the belts 1 and 2 so that the products on the collection conveyor 9 are spaced apart at an approximately constant pitch and so that they are arranged according to the sequence P11, P12, P21, P22. For the sake of simplicity and clarity of illustration, the products are shown aligned along the center line of the collection conveyor 9, it is obvious, however, that they assume various positions along the conveyor, depending on the position of the motorized plowshare 11, 13 (not shown in FIGS. 4A and 4B).

FIG. 4B shows a situation in which the furthest advanced product on the inlet conveyor 7 is the product P12. In this case the sequence of exiting products is P12, P11, P22, P21.

In both cases the pitch between the products coming off the collection conveyor 9 is usually different from the pitch of the products in the two rows carried by the inlet conveyor 7 since the frequency with which the products are discharged from the upstream machines onto the inlet conveyor 7 is different from the optimum frequency for feeding the products to the downstream packaging machine.

The control logic of the device described thus far is summarized in the flowchart shown in FIG. 5.

The motors M1 and M2 are controlled on the basis of the signals arriving from the photoelectric cells F1 and F2, of the pulses from the encoders E1 and E2 which supply information relating to the length of advance of the corresponding belts from a predetermined instant, and with the help of two control parameters or "flags", which in the following text will be indicated as "Flag 1" and "Flag 2" for the two belts 1 and 2, which can assume the value "0" or "1" depending on the conditions of the system.

The flowchart shown in FIG. 5 will be illustrated with reference to the situation exemplified in FIG. 4. Beginning with the START block (block 101) the system operates as follows: initially the system checks to see whether the photoelectric cell F1 is obscured (block 102), i.e. whether a product is in front of the photoelectric cell F1. If the photoelectric cell F1 is not obscured, the system goes on to check the condition of the photoelectric F2 (block 103). As soon as the product P11 (which in the hypothesis shown in FIG. 4A arrives before the product P12) arrives obscuring the photoelectric cell F1, the system reads the position of the motor M1 (block 104), on the basis of the signal from the corresponding encoder E1 and takes this position as a reference for the subsequent operations. The photoelectric cell F2 is then checked to see whether it has been obscured (block 105). If the photoelectric cell F2 does not detect the presence of a product, the system continues to operate on the motor M1, without acting on that part of the system which involves the belt 2. On the other hand, if in the meantime the product P12 reaches the photoelectric F2, obscuring it, the system checks the status of Flag 2 (block 106), then sets the value of Flag 2 as equal to "1", reads the position of the motor M2 and stops it (block 107). This ensures that the product P12 remains in its position at the beginning of the belt 2 while the system acts on the product P11. The system repeatedly increments the angular position of the motor M1 (block 108) by one angular step at a time until the motor M1 has performed a number of steps equal to L1 (block 109) starting from the position read at the instant at which the presence of the product was detected (block 104). The number of steps L1 corresponds to the distance which needs to be maintained between the product P11 and the next product as these products come off the device and are fed to the downstream machine.

Once the pitch L1 has been reached, the system sets the value of Flag 1 (relating to the condition of belt 1) as equal to "0" (block 110) and starts the motor M2 (block 111). The status of Flag 2 (block 112) is then checked. If it is equal to "0", i.e. if in the meantime no product has arrived in front of the photoelectric cell F2, the system recommences the central procedure from block 103, checking whether the photoelectric cell F2 has been obscured. If, on the contrary, during the rotation of the motor M1 from the position read in block 104 to a position in which it has rotated through L1 steps, the product P12 has reached the photoelectric cell F2, Flag 2 has assumed the value "1" (block 107) and the motor M2 has been initially stopped (block 107) and then reactivated (block 111). In this second hypothesis, the system goes on to the procedure described in the lower part of the flowchart shown in FIG. 5, which is basically equivalent to the part described thus far, except for the fact that the motors M1, M2, the photoelectric cells F1 and F2 and the control parameters Flag 1 and Flag 2 are reversed. Irrespective of the reply to the question asked by the block 112, the system will be able (either via the block 106 or via the block 103) to determine the condition in which the photoelectric cell F2 is obscured and, at the instant at which it is obscured, the position of the motor M2 will be detected. This can take place in the block 107, as already described, if the photoelectric cell F2 reads the arrival of the product P12 before the system has positioned the product P11, or in the block 113, if the reply to the question asked in the block 112 is negative.

In both cases the control system reaches a condition in which the photoelectric cell F2 is obscured and then proceeds (in a manner similar to that followed in block 105 for the photoelectric cell F1) to read the other photoelectric cell, i.e. in this case the photoelectric cell F1 (block 114). If in the meantime the photoelectric cell F1 has once again been obscured, the system checks the status of Flag 1 (block 115) and sets it as equal to "1", it reads the position of the motor M1 and stops it (block 116). The position of the motor M2 is then repeatedly increased by one step at a time until it has carried out a number of steps equal to L2 (blocks 117, 118), which corresponds to the distance between the product P12 and the product P11. During this procedure in which the motor M2 is made to advance step-by-step, the condition of the photoelectric cell F1 is checked at each step by the blocks 114, 115, 116. The system then changes the status of Flag 2 setting it as equal to "0" (block 119), starts the motor M1 (block 120) if it had previously been stopped (by means of the operation carried out in block 116), and then checks the status of Flag 1 (block 121). Depending on the value of Flag 1, the system recommences the procedure from block 102 (if Flag 1=0) or from block 105 (for Flag 2=1).

The result of this control procedure is illustrated in FIG. 4A: the products P11, P12, P21, P22 come off the collection conveyor line spaced apart by a pitch of L1, L2, L1, respectively. In order to keep the pitch between the exiting products constant, all that needs to be done is to set L1=L2.

It goes without saying that the drawing shows only one example given solely as a practical demonstration of the invention, it being possible for this invention to vary with regards to form and arrangement without thereby departing from the scope of the underlying concept of said invention. Any reference numerals in the appended claims are there to facilitate the reading of the claims with reference to the description and to the drawing, and do not limit the scope of protection represented by the claims.

We claim:

1. A device for aligning a plurality of products from a plurality of non-correlated inlet paths, the device comprising:

a plurality of conveyors individually receiving the products from the separate inlet paths;

a plurality of sensors, each sensor being associated with one of said conveyors, said each sensor generating a respective arrival signal upon detecting an arrival of a product on a corresponding conveyor;

a plurality of actuators, each actuator being associated with one of said conveyor for moving a product on a corresponding conveyor;

a plurality of position transducers, each position transducer being associated with one of said conveyors for generating a corresponding position signal representing a position of said corresponding conveyor;

a control unit receiving said arrival and position signals, said control unit recognizing when a first product arrives onto one of said conveyors, said control unit controlling said actuator corresponding to said first product to move said first product by a predetermined length, said control unit controlling remaining said actuators to stop movement of product received by remaining said conveyors until said actuator corresponding to said first product has moved said first product by said predetermined length.

2. The device as claimed in claim wherein:

longitudinal alignment means is arranged downstream from said conveyors for longitudinally aligning the products coming off said conveyors.

3. The device as claimed in claim 2, wherein said alignment means includes a collection conveyor with deviating members that deviate a subset of the products according to a common alignment.

4. The device as claimed in claim 3, wherein:

said deviating members include a flexible member which travels around rollers having an axis of rotation that is perpendicular to said collection conveyor.

5. The device as claimed in claim 2, wherein:

an outlet conveyor is located downstream from said alignment means.

6. The device as claimed in claim 1, wherein:

an inlet conveyor is located upstream from said plurality of conveyors and is actuated by a separate independent actuator.

7. The device as claimed in claim 1, wherein:

said control unit causes said actuator associated with said one conveyor on which said first product is located, to advance in successive steps, and, at each step, said control unit checks if a further product has arrived on other inlet paths, and blocks advance of a conveyor corresponding to said further product if necessary.

8. The device as claimed in claim 1, comprising:

two inlet paths and two conveyors.

9. A device in accordance with claim 1, wherein:

said conveyors are positioned adjacent each other.

10. A device for aligning a plurality of products from a plurality of non-correlated inlet paths, the device comprising:

a plurality of conveyors individually receiving the products from the separate inlet paths;

a plurality of sensors, each sensor being associated with one of said conveyors, said each sensor generating a respective arrival signal upon detecting an arrival of a product on a corresponding conveyor;

a plurality of actuators, each actuator being associated with one of said conveyors for moving a product on a corresponding conveyor;

a plurality of position transducers, each position transducer being associated with one of said conveyors for generating a corresponding position signal representing a position of said corresponding conveyor;

a control unit receiving said arrival and position signals, said control unit recognizing when a first product arrives onto one of said conveyors, said control unit controlling said actuator corresponding to said first product to move said first product by a predetermined length, said control unit controlling remaining said actuators to retard movement of product received by remaining said conveyors until said actuator corresponding to said first product has moved said first product by said predetermined length.

11. A method for aligning a plurality of products from a plurality of non-correlated inlet paths, the method comprising the steps of:

detecting an arrival of a first of the products from one of the inlet paths;

advancing said first product by a plurality of unitary steps until said product has advanced a distance of predetermined length;

checking after every said step for arrival of additional products from one of the inlet paths;

retarding advance of said additional products until said first product has moved said predetermined distance;

fully advancing a next one of the products when said first product has advanced said predetermined distance.

12. The method as claimed in claim 11, wherein:
two inlet paths are provided.

13. The method as claimed in claim 11, wherein:
a conveyor controlled by a corresponding actuator is provided for each inlet path:

a sensor is provided for each inlet path determining the arrival of the product onto the corresponding inlet path.

14. The method as claimed in claim 13, wherein:
downstream from said conveyor, the products arriving via one of said conveyors are made to translate transversely to a direction of advance of said one conveyor to move the products into longitudinal alignment.

15. A method for aligning a plurality of products from a plurality of non-correlated inlet paths, the method comprising the steps of:

providing a plurality of conveyors individually receiving the products from the separate inlet paths;

providing a plurality of sensors, each sensor detecting an arrival of a product on a corresponding conveyor;

providing a plurality of actuators, each actuator being associated with one of said conveyors for moving a product on a corresponding conveyor;

providing a plurality of position transducers, each position transducer measuring a position of said corresponding conveyor;

detecting from said plurality of sensors when a first product arrives onto one of said conveyors;

moving said first product by a predetermined length;

only advancing addition product received by remaining said conveyors after said first product has moved said predetermined length.

16. A method for aligning a plurality of products from a plurality of non-correlated inlet paths, the method comprising the steps of:

providing a plurality of conveyors individually receiving the products from the separate inlet paths;

providing a plurality of sensors, each sensor detecting an arrival of a product on a corresponding conveyor;

providing a plurality of actuators, each actuator being associated with one of said conveyors for moving a product on a corresponding conveyor;

providing a plurality of position transducers, each position transducer measuring a position of said corresponding conveyor;

detecting from said plurality of sensors when a first product arrives onto one of said conveyors;

moving said first product by a predetermined length;

retarding advancement of addition product received by remaining said conveyors until said first product has moved said predetermined length;

fully advancing said addition product after said first product has moved said predetermined length.

17. A method in accordance with claim 11, wherein:
said fully advancing is performed after said first product is said predetermined distance ahead of said addition product.

* * * * *